United States Patent [19]

Asher, Jr. et al.

[11] Patent Number: 4,594,965
[45] Date of Patent: Jun. 17, 1986

[54] SYMBIOTIC AQUA-CULTURE

[76] Inventors: Donald F. Asher, Jr., Harness Creek View Dr., Annapolis, Md. 21403; Otto J. Munz, deceased, late of Arlington, Va.; by Gerta H. Munz, Executrix, 600 S. 22nd St., Arlington, Va.

[21] Appl. No.: 290,255

[22] Filed: Aug. 5, 1981

Related U.S. Application Data

[63] Continuation-in-part of Ser. No. 107,515, Dec. 29, 1979, abandoned.

[51] Int. Cl.$^4$ ............................................... A01K 61/00
[52] U.S. Cl. ......................................................... 119/3
[58] Field of Search ................................... 119/3, 2, 4

[56]     References Cited
U.S. PATENT DOCUMENTS

| | | | |
|---|---|---|---|
| 2,605,742 | 8/1952 | Burkey | 119/3 |
| 3,473,509 | 10/1969 | Miyamura | 119/3 X |
| 4,003,337 | 1/1977 | Moore | 119/3 |
| 4,203,389 | 5/1980 | Gasper, Jr. et al. | 119/3 |
| 4,212,268 | 7/1980 | Chapman | 119/3 X |

Primary Examiner—Robert P. Swiatek
Attorney, Agent, or Firm—Dennis H. Lambert

[57] ABSTRACT

A symbiotic aqua-culture system includes a barrier fence surrounding a protected body of water in which is extended a conduit having a plurality of tubes therein and which is coaxial with a tubular screen. An electrode in the form of a helically wound wire on the conduit coacts with the tubular screen, which comprises a second electrode, to form an electrical field which attracts marine life and stimulates the growth thereof. The barrier fence may also be constructed to produce an electrical field to inhibit or kill undesired marine organisms attempting to pass through the fence. The tubes within the conduit are connected to sources of various materials, such as nutrients, algaecide, heat, etc., and valves are connected with the tubes to control flow therethrough. Orifices connect the tubes with the surface of the conduit along its length to supply the materials as desired. The method of symbiotic mari-culture using the structure is also disclosed.

10 Claims, 7 Drawing Figures

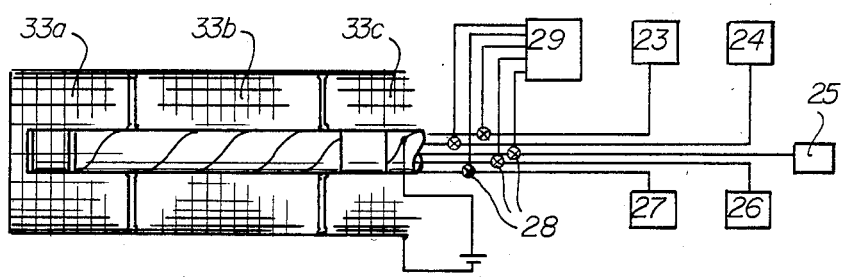
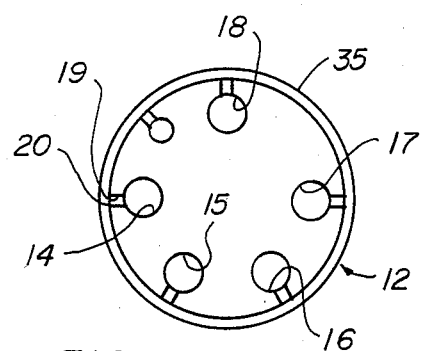
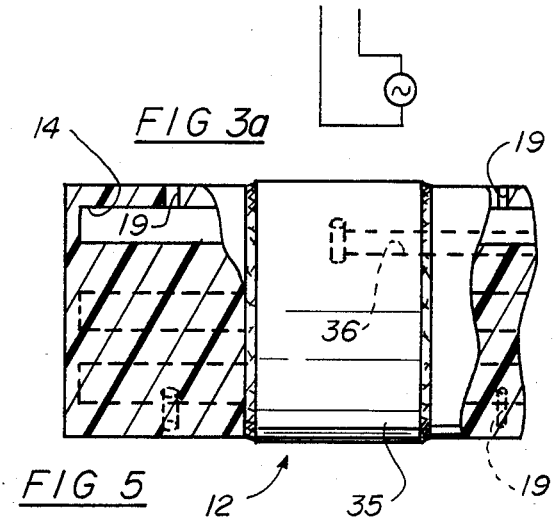
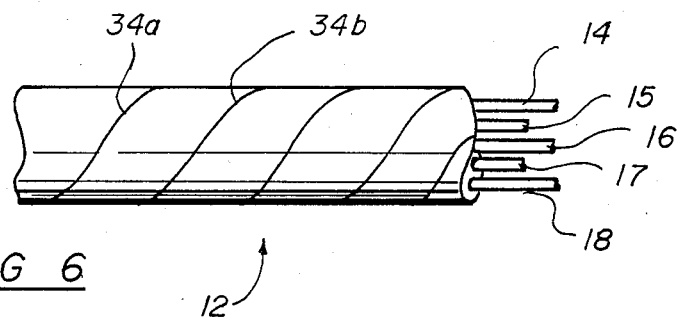

SYMBIOTIC AQUA-CULTURE

This application is a continuation-in-part of copending application Ser. No. 107,515, filed Dec. 29, 1979, and now abandoned.

BACKGROUND OF THE INVENTION

1. Field of the Invention

The invention relates to water culture and marine husbandry and is applied by way of example to the art of growing oysters in a controlled environment or marine habitat, effected by a combination of electrical stimulation and controlled supply of nutrients, heat and other desired materials to the controlled environment. More particularly, the present invention relates to the use of a conduit having a plurality of tubes therein, individually controlled, for supplying various materials to the environment along the length of the conduit, via orifices connecting the tubes with the surface of the conduit, and the combination therewith of electrical stimulation to attract and promote growth of the marine organisms being cultured.

2. Prior Art

U.S. Pat. Nos. 2,922,393, dated Jan. 26, 1966, and 3,017,856, dated Jan. 23, 1962, to O. J. Munz, illustrate and disclose a method of oyster farming, employing a single line carrying spaced cultch areas for collecting a spat, for growing oysters thereon and harvesting them by pulling the line with the oysters through a stripping die.

The above patents and U.S. Pat. No. 3,013,863, dated Dec. 15, 1961, disclose marine life attracting materials, and U.S. Pat. No. 3,013,863 also discloses the temperature limits within which oysters thrive.

U.S. Pat. Nos. 3,305,964, 4,133,294, 3,766,888, 3,103,202 and 4,137,869 teach various aspects of marine husbandry, such as the established specifications of tolerable physical parameters between nutrients, salinity, temperature, algae, food-quantities, densities, circulation and light for oysters and other marine life. In addition, U.S. Pat. No. 3,058,252 teaches a particular electrical circuit for electric fishing, and "German Commercial Electrical Fishing Device", *Fishery Leaflet* 348, U.S. Department of the Interior, 1949, by Robert B. Houston, Jr., teaches various voltages and conditions under which fish are attracted and growth stimulated.

SUMMARY OF THE INVENTION

It is the principal object of the present invention to provide a controlled environment for enhancing the growth and productivity of marine life, and particularly oysters, by the use of electrical stimulation and controlled supply of nutrients, algaecides, heat and the like to the environment, and wherein the supply of nutrients, etc. is through a conduit having a plurality of tubes therein, each individually controlled.

A further object is to provide apparatus for symbiotic aqua-culture, wherein the symbiosis of various interdependent forms of water life is enhanced.

A more specific object of the invention is to provide a conduit with multiple tubes therein for conducting various materials beneficial to stimulation and growth of marine life to a controlled marine habitat, with means on the conduit and spaced from the conduit for creating an electrical field to attract marine life and enhance the growth thereof.

Another object of the invention is to provide a conduit having a plurality of tubes therein for conducting various materials to a controlled marine habitat, with a screen disposed in coaxial relationship to the conduit and electrically associated with the conduit to create an electrical field surrounding the conduit to attract and promote growth of marine life, and further, wherein the annular space between the conduit and screen is divided into a plurality of longitudinally spaced zones for growth of different types of marine life.

Yet another object of the invention is to provide a conduit and coaxially disposed screen with electrical means and nutrient supply tubes for enhancing the symbiosis of various interdependent forms of marine life into an organized water culture on the conduit, and wherein inflatable sleeves or bladders are carried by the conduit to raise or float the conduit for inspection, repair and/or harvesting of marine life.

BRIEF DESCRIPTION OF THE DRAWINGS

In the drawings, wherein like reference numerals indicate like parts throughout the several views.

FIG. 3 is a diagrammatic view of the conduit and its connection with sources of various materials supplied through the tubes in the conduit, and of one suitable source of electrical energy connected with the conduit and screen;

FIG. 3a is a fragmentary view of another suitable source of electrical energy which may be connected to the conduit and screen;

FIG. 4 is a transverse sectional view of the conduit;

FIG. 5 is a longitudinal sectional view of the conduit of FIG. 4 and

FIG. 6 is an enlarged, fragmentary view of a modification of the conduit with two wires on the surface.

DETAILED DESCRIPTION OF THE PREFERRED EMBODIMENTS

Figure 1:
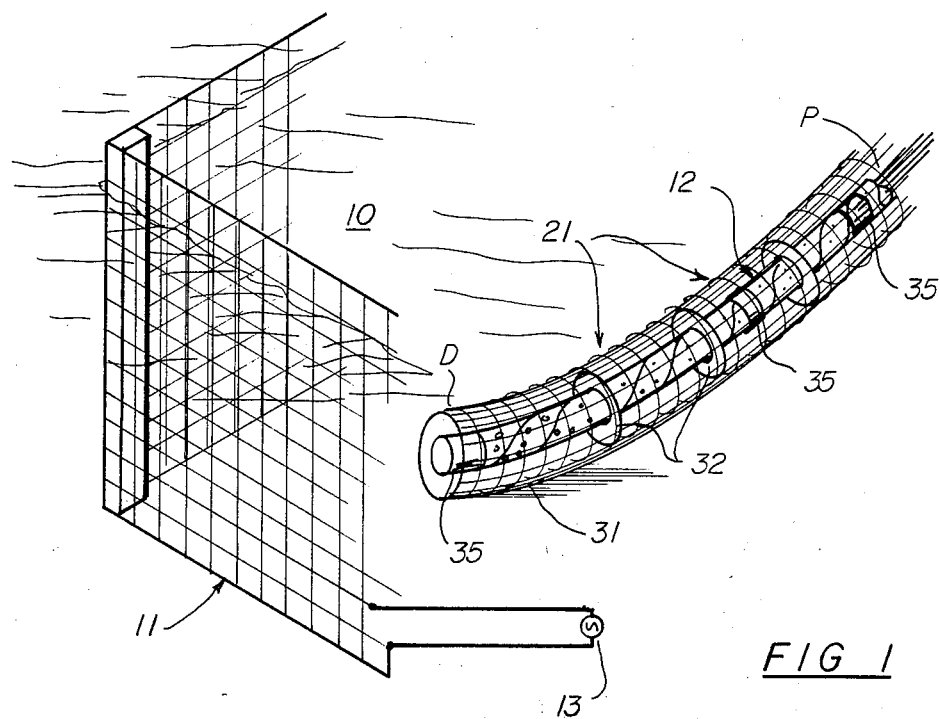
FIG. 1 is a diagrammatic showing in perspective of a preferred form of the invention, with the main components thereof in combination.
Figure 2:
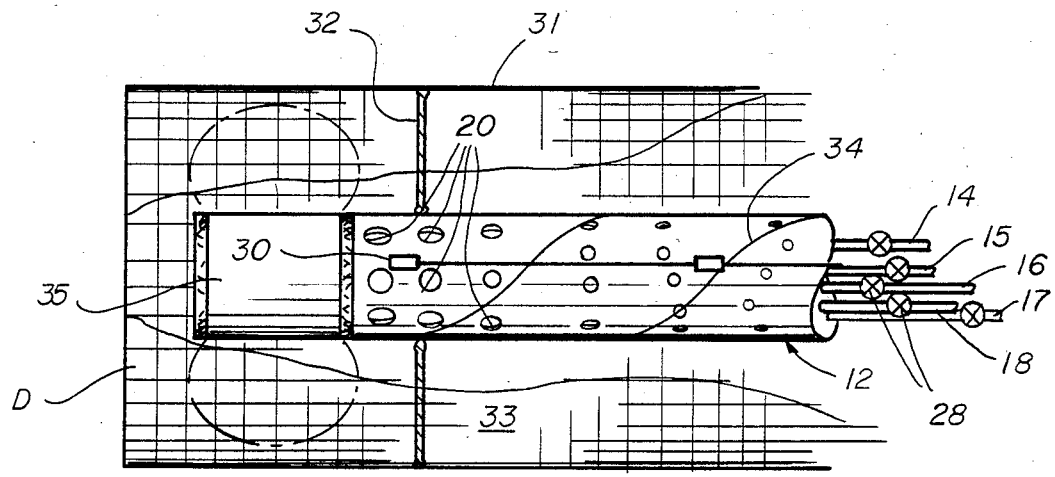
FIG. 2 is a greatly enlarged view in elevation, with parts broken away for the purpose of clarity, of the conduit and coaxial screen of the invention.

In FIG. 1 a body of water 10 is enclosed by a barrier fence 11 and a conduit 12 extends into the enclosed body of water for supplying nutrients, algaecides, electrical energy, heat and other desired materials to the enclosed, protected habitat or body of water.

The fence 10 is of suitable wire mesh construction, and may either comprise two different types of wire, such as copper and zinc, for creating an electrical field through galvanic action, or may be connected to a suitable source of AC or DC electrical energy, such as shown at 13. It is intended that the electric potential on the fence 11 be of sufficient magnitude that passage of fish, predators and other undesired marine life will be barred. Such electric potential magnitudes are readily apparent from the prior art, including some of the patents cited previously herein, and such teaching does not comprise a part of this invention.

The conduit 12 is preferably made of flexible, sea water-resistant material, and has a plurality of tubes 14, 15, 16, 17 and 18 extending therein from the proximal end P thereof to the distal end D. The tubes are in communication with the surface of the conduit through a plurality of short passages 19 and orifices 20, and the orifices decrease in size from the distal end D to the proximal end P to compensate for pressure loss along the conduit length, whereby an equal volume of material is discharged through the orifices throughout the length of the conduit. The length of the outer surface area of the conduit is preferably divided into a plurality of longitudinally spaced cultch areas 21, separated from one another by interposed antifouling areas 22, thus preventing undesirable cluster growth of oysters, which would adversely affect their size.

Each tube is connected with a suitable source of material, such as nutrient supply 23, algaecide supply 24, hot water supply 25, oxygen rich water supply 26 and anti-fouling supply 27. The supplies may be pressure fed or gravitationally fed, as desired, and flow of each through the respective tubes is controlled by suitable flow control valves 28 interposed in the tubes at the proximal ends thereof. The valves are controlled by any suitable means, such as timer 29, which opens or closes the appropriate valve or valves in accordance with a predetermined sequence to supply the proper materials in the proper quantities to achieve the desired result. The amount of each material supplied is dependent upon the type of marine organism being grown, and acceptable limits may be determined from the teaching of the prior art. For example, the hot water supply tube 25 and valve 28 may be controlled in response to conditions sensed by suitable sensors (thermostats) 30 spaced along the conduit and connected with the control device or timer 29.

A wire mesh screen 31 is disposed in coaxial relationship with the conduit 12 and is held in spaced relationship thereto by means of spacers 32 at intervals along the length of the conduit. For instance, the conduit may have a diameter of one-half ($\frac{1}{2}$) inch or less, and the screen 31 may be spaced from the conduit approximately one (1) inch. The screen itself may have a mesh size of one-fourth ($\frac{1}{4}$) inch. The screen and conduit define an annular space or habitat 33 in which growth of marine life is enhanced and in which the oysters or other organisms are confined until they reach a predetermined size ready for harvesting. The spacers 32 also may serve the function of dividing the habitat 33 into a plurality of separate habitats 33a, 33b, etc. for growth of different types of oysters, etc., at the same time.

A wire 34 is wound around the conduit from the distal end to the proximal end thereof and comprises one electrode, the screen 31 comprising another, between which an electrical field is created for attracting marine organisms and stimulating the growth thereof. The screen may comprise one metal, for instance zinc, and the wire another, for instance copper, whereby the electrical field is created by galvanic action. Alternatively, the screen and wire may be connected to a suitable AC or DC source of electricity, such as shown, for example, in U.S. Pat. No. 3,058,252. The wire 34, in addition to comprising one of the electrodes of the electric field generating circuit, also reinforces the conduit.

A plurality of inflatable sleeves or bladders 35 are attached to the conduit along its length and are connected with an air hose 36 in the conduit whereby when the bladders are inflated, the conduit is floated to the surface for inspection, repair or harvesting of the marine life growing thereon. In a typical installation, the bladders would be spaced approximately twenty (20) feet apart.

A modification of the invention is shown in FIG. 6, wherein two wires 34a and 34b are wound around the conduit for creating an electrical field therebetween. The wires 34a and 34b may be of dissimilar metals for production of an electrical field by galvanic action, or they may be connected to a suitable AC or DC source of electrical energy.

In connection with the invention, it should be noted that the property of salt in ocean and brackish waters is utilized to serve as an electrolyte between a positive and a negative electrode to develop a low grade electrical current between them, i.e. a galvanic battery.

Suitable marine life sustaining materials are, for instance, nutrients, bacteria, plankton, various forms of protein, enzymes, salts, fertilizers, minerals animal blood, meat and vegetable powders and light, heat, air and oxygen.

Examples of suitable marine life propogating materials are air percolation, pesticides, chemicals, antifouling agents and fences.

The conduit of the invention thus offers a new system of symbiotic mari-culture by providing means to propogate simultaneously within the same body of water different marine lives which are interdependent upon one another, and which, by their own existence, excretions, propogation and decay support others. The selection of the interdependent forms of marine life varies in accordance with the requirements of the types of the marine life to be raised as crops and the given aquatic and climatic environments.

The mari-culture in accordance with the invention may be practiced in large open bodies of water such as oceans, lakes or bays, or it may be practiced in confined bodies of water such as a tank or pool, and waste heat from industrial operations may be used to provide the appropriate heat to the system of the invention, for growing oysters, mussels, fish, plankton, algae, lobsters, crabs, shrimp and shellfish as well as vegetable matter such as kelp.

For different types of marine life cultivation, some of the tubes of the conduit are omitted, or additional tubes may be provided, and the tubes selected may be positioned in different relationships to each other and to the body of water. For instance, the tubes may be spirally arranged within the conduit so that the orifices associated therewith are more evenly spaced relative to the outer surface of the conduit. Moreover, in oyster farming, the conduits should be elevated above the bottom of the body of water with the cultch areas located on the upper side of the conduit. For air or gas percolation and fertilizer distribution, the orifices are preferably located on the underside of the conduit.

Further, light may be provided in association with the conduit to attract algae, on which the oysters then feed.

The method of symbiotic mari-culture using the above-described structure comprises the steps of fencing in a body of water and introducing marine life propogating materials into the fenced body of water, while at the same time, electrical energy is applied to the area to attract and stimulate the growth of marine life.

What is claimed as new and desired to be secured by Letters Patent is:

1. A marine husbandry system, comprising:
   a conduit submerged in a body of water and having a plurality of tubes therein, each closed at one end and open at its other end, connected at their open ends with sources of fluids, and a plurality of outlet orifices communicating with each tube, connecting the tubes with the conduit exterior for discharge of fluid conducted by the tubes; and electrical field producing means comprising a pair of exposed, spaced electrodes carried by the conduit for creating an electric potential therebetween to attract and enhance the growth of marine life.

2. A marine husbandry system as in claim 1, wherein:

one of the electrodes comprises a screen spaced from and coaxial with the conduit, the other electrode comprising a wire on the outer surface of the conduit.

3. A marine husbandry system as in one of claims 1 or 2, wherein:

a wire mesh barrier fence encloses a portion of said body of water, defining a protected marine habitat; and the conduit extends into the protected marine habitat.

4. A marine husbandry system as in claim 3, wherein:

a valve is in each tube for controlling flow therethrough.

5. A marine husbandry system as in claim 1, wherein: valve means is associated with each tube for controlling flow therethrough.

6. A marine husbandry system as in one of claims 1 or 2, wherein:

a source of heat is connected with the conduit for raising the temperature of the water within the body of water.

7. A marine husbandry system as in claim 6, wherein:

the source of heat comprises hot water conducted through one of the tubes.

8. A marine husbandry system as in claim 1, wherein:

the electrodes are of dissimilar metals and the electric field potential is created between them by galvanic action.

9. A marine husbandry system as in claim 1, wherein:

the electrodes are connected with a source of alternating current.

10. A marine husbandry system as in claim 1, wherein:

the electrodes are connected with a source of direct current.

* * * * *